United States Patent [19]
Fullerton

[11] 3,727,474
[45] Apr. 17, 1973

[54] AUTOMOTIVE TRANSMISSION

[75] Inventor: Robert L. Fullerton, South Lake Tahoe, Calif.

[73] Assignee: Fullerton Transiission Company, Sacramento, Calif.

[22] Filed: Oct. 4, 1971

[21] Appl. No.: 186,273

[52] U.S. Cl. ................................. 74/200, 74/740
[51] Int. Cl. ...................... F16h 15/08, F16h 37/12
[58] Field of Search ............................... 74/200, 740

[56] References Cited

UNITED STATES PATENTS

| 3,413,864 | 12/1968 | Magill et al. | 74/200 |
| 3,494,224 | 2/1970 | Fellows et al. | 74/200 |
| 3,653,272 | 9/1972 | Scheiter | 74/200 X |

Primary Examiner—Leonard H. Gerin
Attorney—Marcus Lothrop

[57] ABSTRACT

An automotive transmission has a drive tube rotatably mounted on a frame and carrying a drive disc having a first half-toroidal friction surface and a free-running neutral disc having a friction surface continuing the first friction surface. A driven tube is also rotatably mounted on the frame and carries a driven disc having a second half-toroidal friction surface facing the first friction surface. Tiltably and rotatably mounted between the discs are transmission discs frictionally engageable with the friction surfaces. The transmission discs are tiltable to afford various speed ratios and a neutral position. The tilting device is either manual or centrifugal. The output is either direct or through a planetary reversing gear.

14 Claims, 11 Drawing Figures

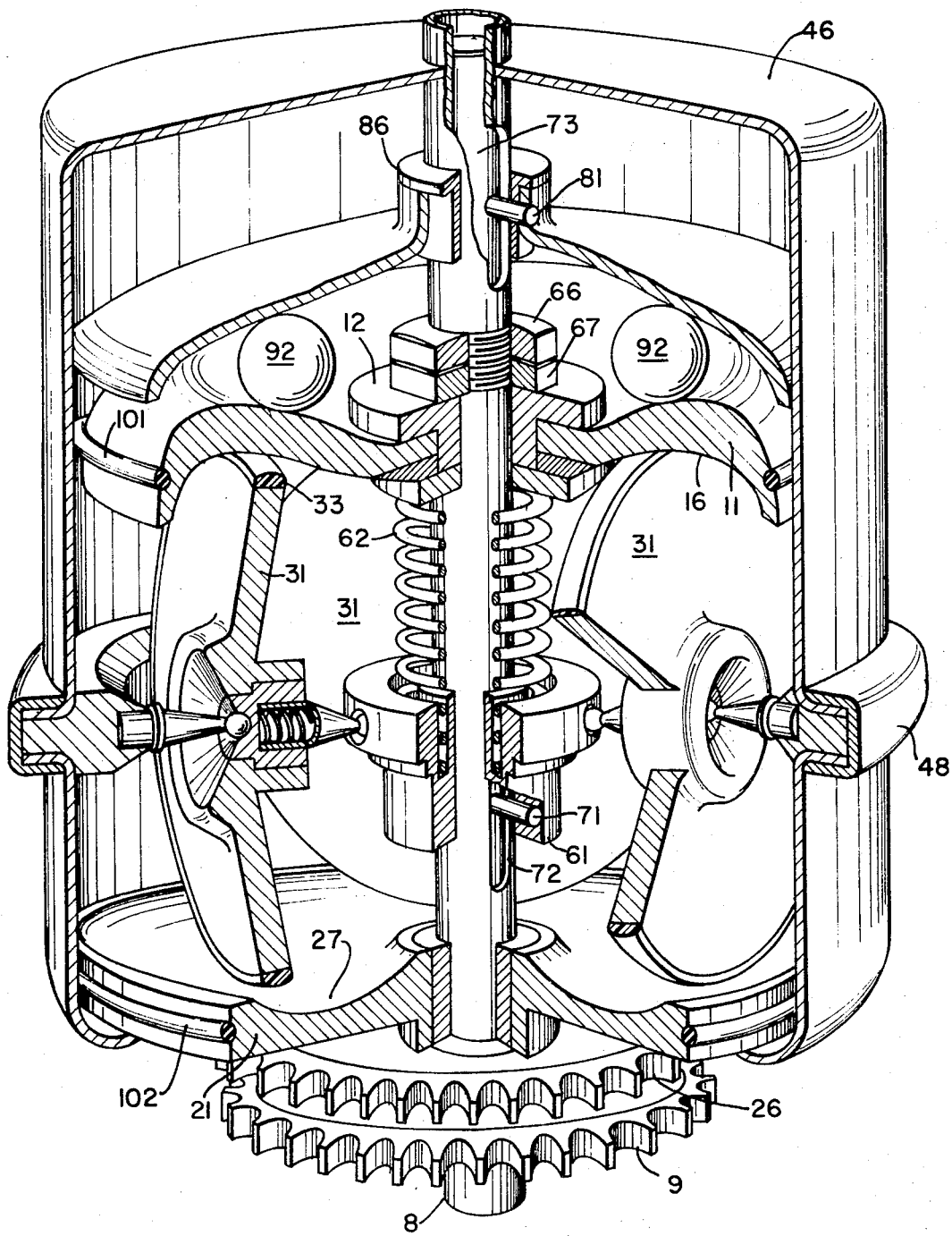
FIG_1

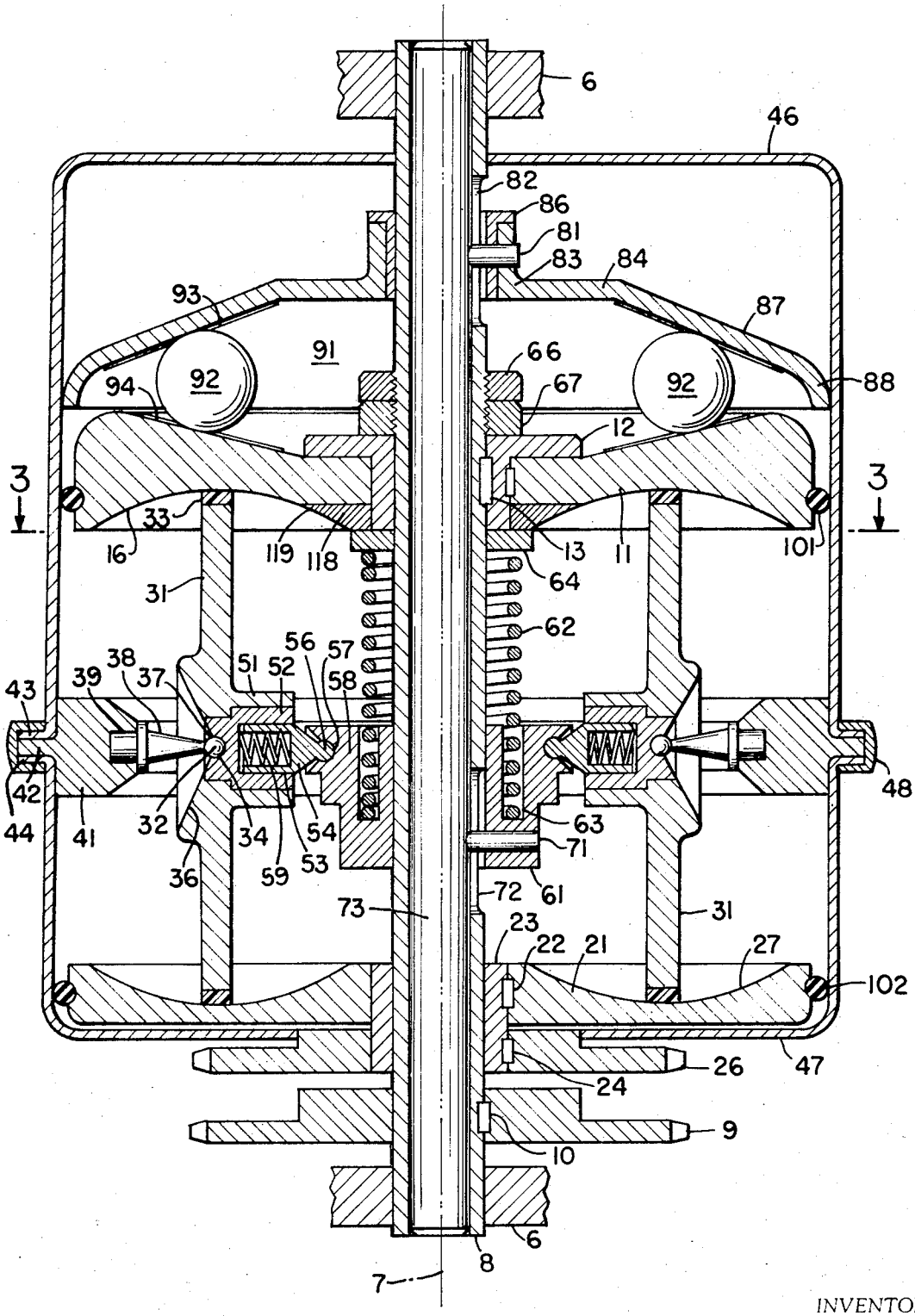
FIG_2

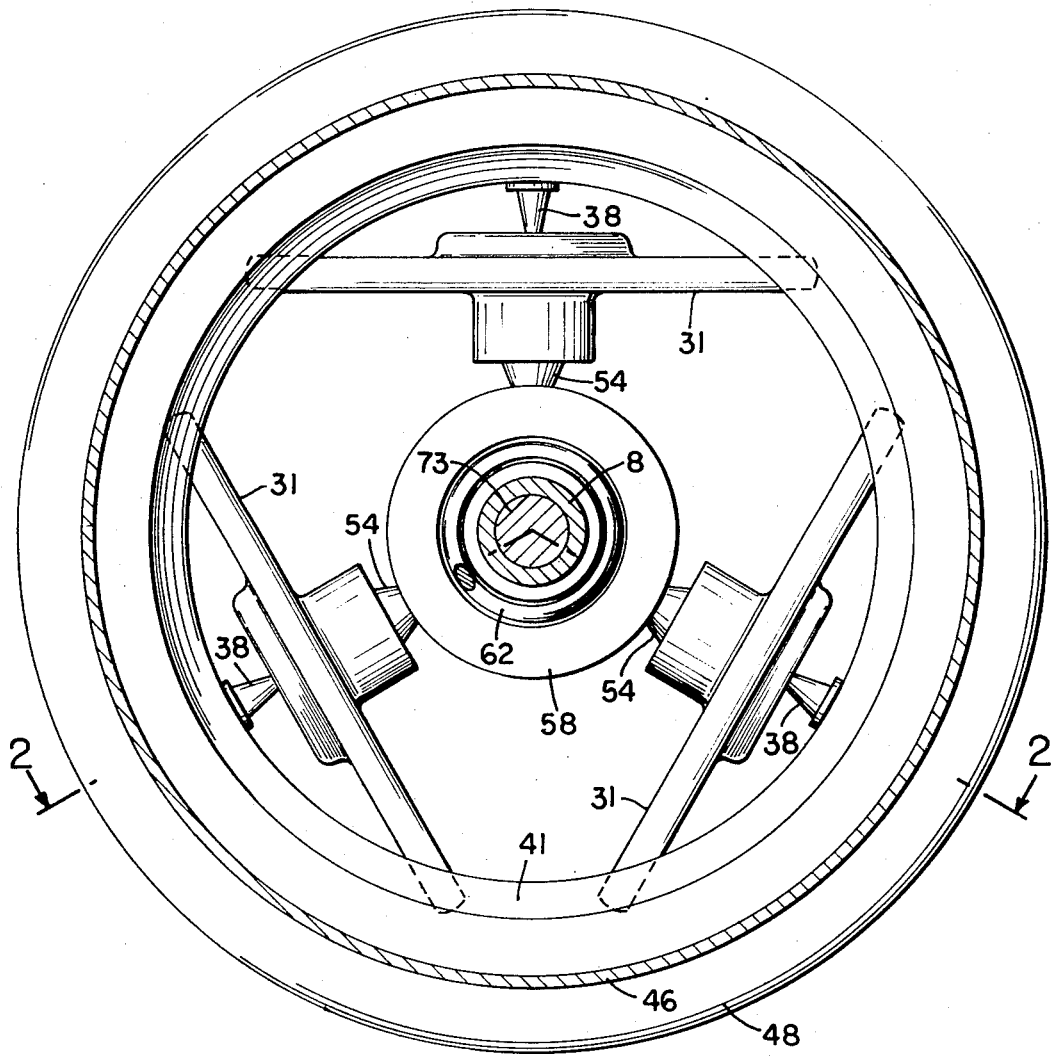
FIG_3

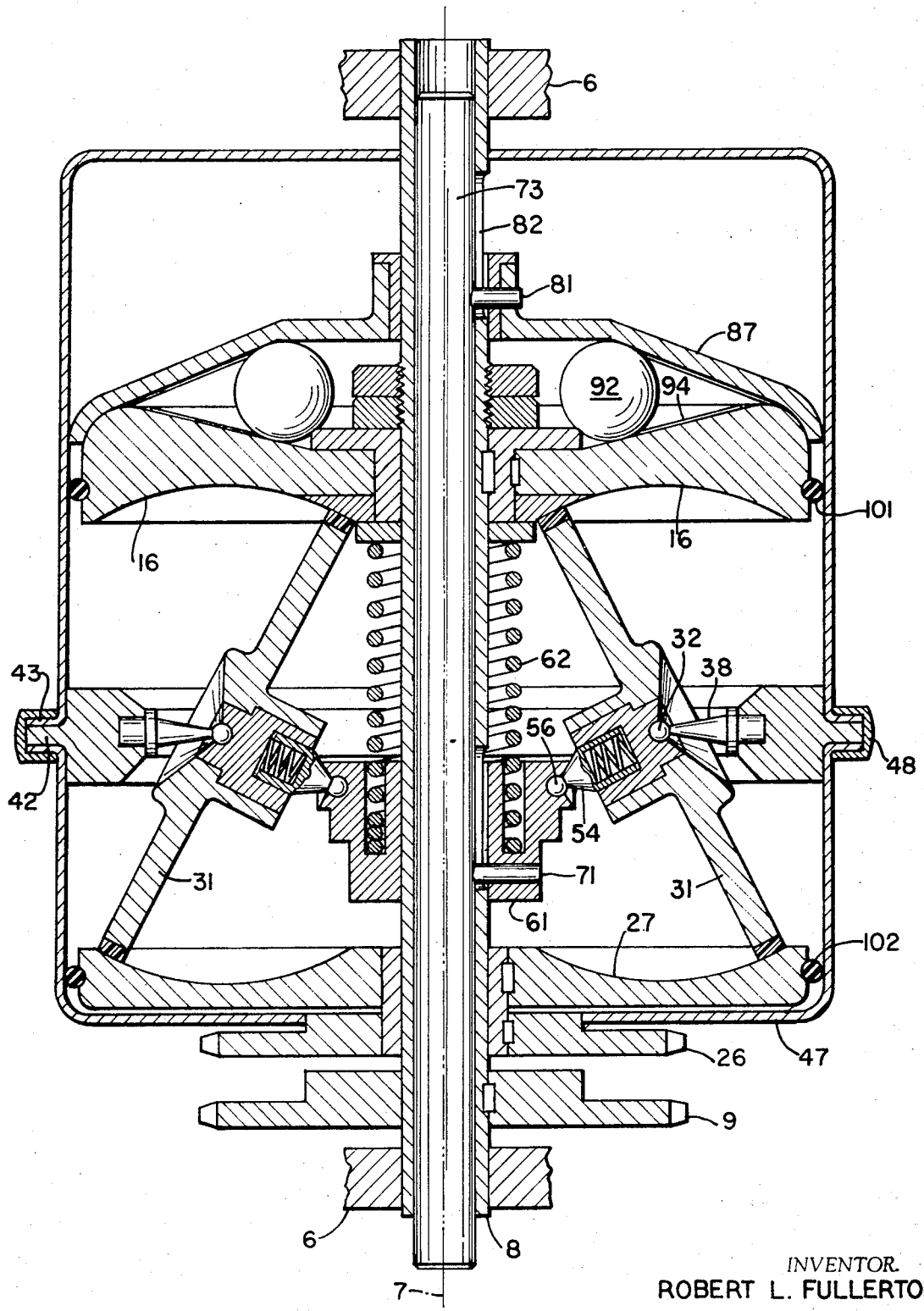
FIG_4

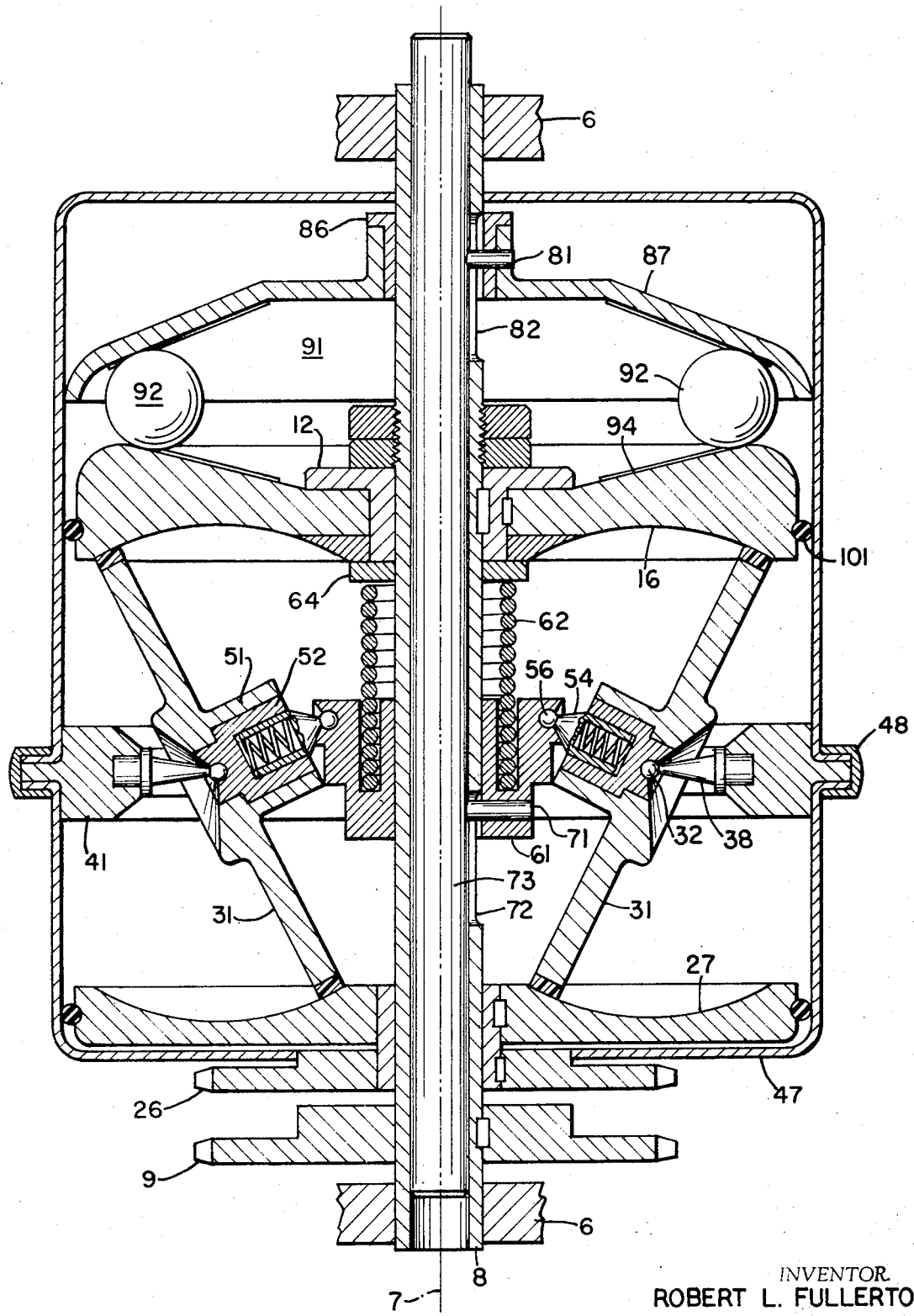
FIG_5

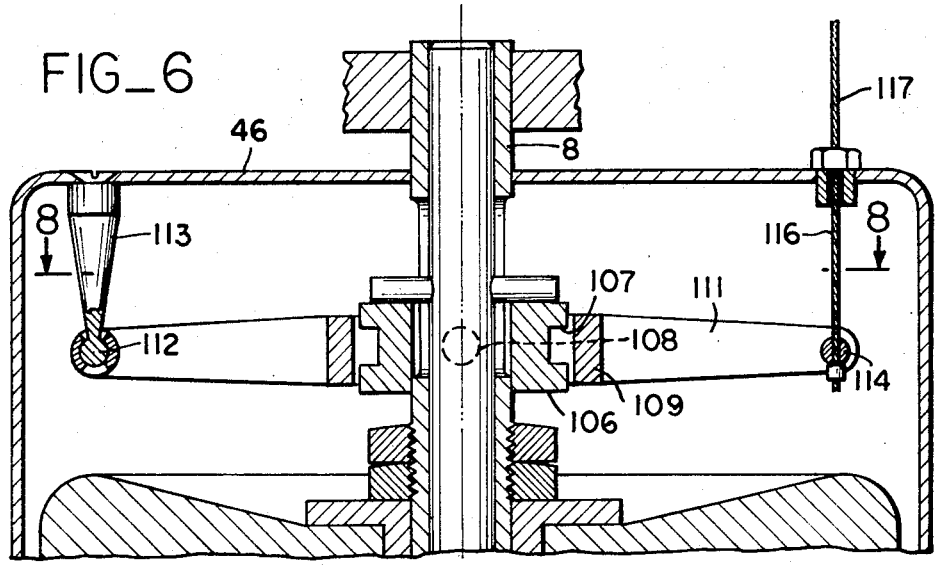
FIG_6
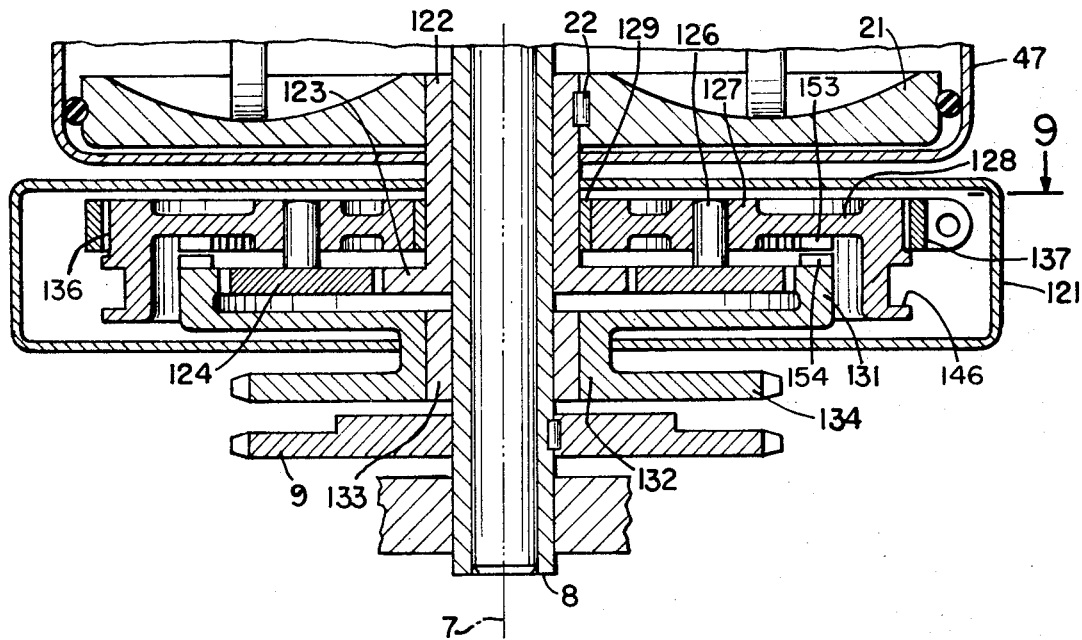
FIG_7

PATENTED APR 17 1973 3,727,474
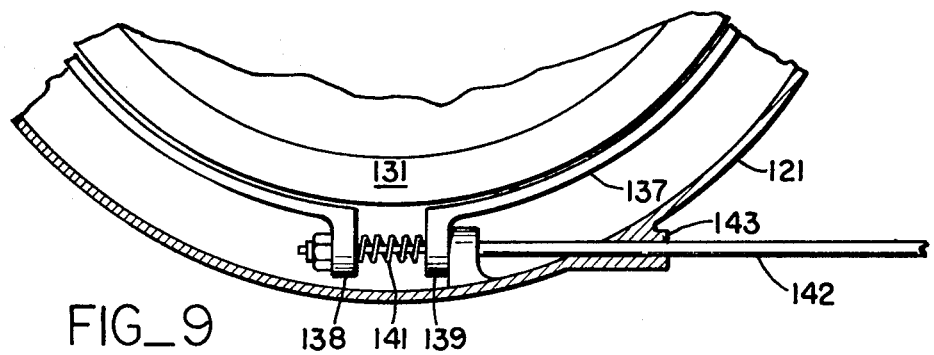
FIG_9
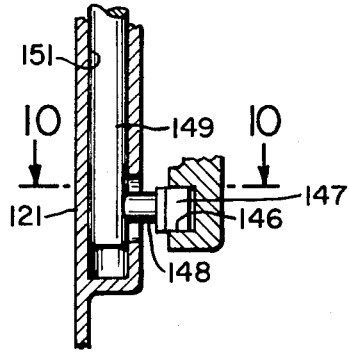
FIG_11
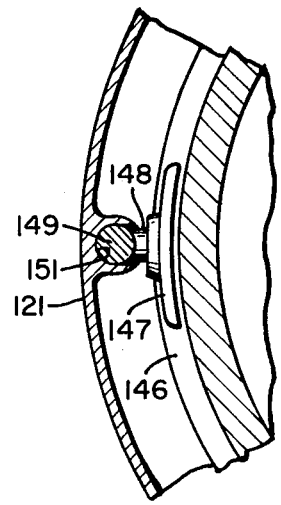
FIG_10
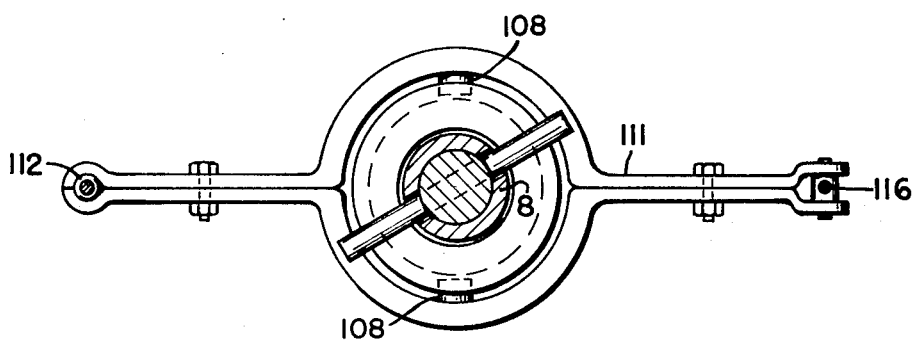
FIG_8
INVENTOR.
ROBERT L. FULLERTON
BY *Lothrop r West*
ATTORNEYS

AUTOMOTIVE TRANSMISSION

There are many applications in which power input through a driving member needs to be transformed in speed ratio, particularly, and in torque transmittal characteristics with respect to an output shaft. It is also highly advisable in many environments to provide a neutral or no-drive position for the transmitting mechanism. Transmissions of this sort, although usable in stationary locations in connection with various sorts of transmission shafting, are especially useful in connection with automotive vehicles; for example, those having the characteristics of snowmobiles. In this description, I refer to such transmissions despite their particular environment as automotive transmissions and the description is especially concerned with the automotive field although it is to be understood that the utility of the devices is not confined to that type of application.

In automotive transmissions, particularly for relatively light vehicles, there is a need for a variable "gear ratio" so-called, or a continuously variable ratio between the speed of the input shaft and the speed of the output shaft and a need for a variable ratio of considerable extent so that the vehicle performance can be widely altered by changing the transmission ratio.

Present day transmissions in many forms afford only a step-by-step ratio relationship. A continually varying ratio in many instances is quite helpful. In addition, it is highly desirable to have an uncoupled or neutral position readily available without cumbersome extra mechanism. The same is true of a reversing arrangement so that the output shaft rotation may be opposite to that of the input shaft rotation or may be the same.

It is therefore an object of my invention to provide an automotive transmission in which the ratio of transmission from the input shaft to the output shaft and vice versa is continuously variable.

Another object of the invention is to provide an automatic transmission in which the ratio variation can be easily accomplished over a wide range.

A further object of the invention is to provide an automotive transmission in which there is an uncoupled or neutral position.

A further object of the invention is to provide an automotive transmission in which the variation in speed ratio is accomplished automatically; for example, in response to centrifugal force.

Another object of the invention is to provide an automotive transmission in which the variation in the ratio of the transmission can be closely controlled manually.

A further object of the invention is to provide an automotive transmission having a reverse gear incorporated therewith in an integral fashion.

Another object of the invention is to provide an automotive transmission that is extremely light and compact, especially for installation in similar environments.

Other objects together with the foregoing are attained in the embodiments of the invention described in the accompanying description and illustrated in the accompanying drawings, in which:

FIG. 1 is a diagrammatic, perspective view with portions broken away of an automotive transmission constructed in accordance with one form of the invention, some parts being omitted for improved clarity of disclosure;

FIG. 2 is a cross section in several planes converging on a central axis as shown in FIG. 3 and developed into a flat plane for FIG. 2;

FIG. 3 is a cross section the plane of which is indicated by the line 3—3 of FIG. 2;

FIG. 4 is a view comparable to FIG. 2 but showing the ratio transmitting elements in a different position;

FIG. 5 is a view similar to FIG. 2 but showing the ratio transmitting elements in a still different position;

FIG. 6 is a cross section partly diagrammatic showing a modified, manual control of the speed ratio mechanism;

FIG. 7 is a cross section similar to FIG. 6 showing an alternative, planetary reverse, final drive mechanism;

FIG. 8 is a cross section on the line 8—8 of FIG. 6 showing a detail of the controlling mechanism;

FIG. 9 is a fragmentary detail in section, the plane of which is indicated by the line 9—9 of FIG. 7;

FIG. 10 is a detail showing in cross section a portion of a shifting mechanism for the reverse gear of FIG. 7, the plane of section being indicated by the line 10—10 of FIG. 11; and FIG. 11 is a fragmentary cross section of the shifting mechanism of FIG. 10.

While the automotive transmission of the invention can be incorporated in a large number of different ways, it has with considerable success been incorporated as shown herein, particularly for application in connection with snowmobiles and comparable vehicles. In such an installation there is provided a frame 6 which is diagrammatically illustrated to indicate any of the customary mountings within which the automotive transmission is utilized. Mounted on the frame 6 for rotation thereon about a through axis 7 is a drive tube 8. This tube is customarily rotated about the axis by a drive sprocket 9 secured thereto by a key 10 and having a chain connection to any suitable source of motive power; for example, an air-cooled gasoline engine.

Situated on the drive tube 8 is a drive disc 11 having a hub 12 secured to the disc 11 and also having a key 13 securing the hub to the drive tube 8, so that in effect the drive disc 11 and the drive tube 8 always turn in unison about the axis 7.

The drive disc 11 is especially contoured to have a first half-toroidal friction surface 16. This is referred to generally as "half-toroidal" although in fact the surface configuration is only some fraction of a mathematical toroid generated about the axis 7 and in fact is less than and up to one-half thereof. The particular extent of the friction surface 16 is varied by design considerations having to do with the range of speed ratios involved, the desired angularity of the parts and other factors which, although variable, do not affect the fundamental principle of operation of the structure. For convenience herein, such a friction surface 16 is referred to as "half-toroidal" even though its extent may be somewhat less than a complete half toroid.

Symmetrically disposed with respect to the drive disc 11 about the axis 7 and facing that drive disc is a driven disc 21. This disc is connected by a key 22 to a hub 23 journaled on the drive tube 8 and having a key 24 connecting the hub 23 to a driven sprocket 26 connected by a chain (not shown) to any suitable form of driven instrumentality.

The disc 21 has a half-toroidal, second friction surface 27 of a character similar to that of the surface 16 and to which similar remarks apply. In any one installation it is usual to have the surface 16 and the surface 27 mirror images of each other.

Designed to be disposed between the discs 11 and 21 are one or more transmission discs 31. Since but a single such disc is necessary for the operation of the structure, but one will be described. However, it is to be noted in the figures that three identical such discs are utilized. They are disposed equidistantly and symmetrically about the axis 7 and illustrated in the figures by section planes which pass through the individual discs and are developed into the flat drawing plane. Each of the discs 31 is a member designed to rotate about a point 32. This is a point disposed on the circular generatrix of the toroid of which the surfaces 16 and 27 are representative elements. Each disc 31 is preferably provided with an excellent peripheral friction surface 33, diagrammatically illustrated, to represent either a specially treated surface of the disc 31 or to represent a special rim having desirable frictional characteristics.

Pursuant to the invention, the disc 31, and its companion discs, is mounted for rotation. The mounting is effectuated by a hemispherical socket 34 at the center of the disc 31 and from which the disc walls diverge in the shape of a cone 36. The hemispherical socket 34 is designed to rotate on a ball 37 forming the end of a support 38 including a stem which has a base 39 secured in a peripheral ring 41. The ring 41 is mounted and secured in appropriate position concentric with the axis 7 and with its plane normal to such axis by a peripheral flange 42. The flange is conveniently clamped between companion flanges 43 and 44 on housing members 46 and 47 by a clamp ring 48 of the customary kind. The housing sections 46 and 47 conveniently extend down to and into a tight fit with the exterior of the drive tube 8, there usually being seals at the intersection of these parts, but such seals are not shown for clarity herein. The mounting thus provided thus affords a firm and appropriate interrelationship between the ring 41 and the main frame 6, so that, in effect, the ball 37 is held precisely in position. With this arrangement the transmission disc 31 can spin about the center of the ball 37 while still in contact with the friction surfaces 16 and 27, and if the contact is appropriate can transmit power from one to the other.

The ratio of speeds transmitted from the disc 11 to the disc 21 depends upon the inclination or angle of the transmission disc 31 with respect to the axis 7. That is, when the disc 31 is in a position as shown in FIG. 2 with the plane of rotation of the disc substantially parallel to the axis 7, then the speed ratio of the discs 11 and 21 is unity and there is no substantial difference in the speed of rotation of such discs. However, if the disc 31 happens to be inclined or tilted as shown in FIG. 5, then the radius of the frictional drive to the periphery of the transmission disc 31 at the driving disc 11 is much greater than the radius of application of the frictional force from the transmission disc 31 to the driven disc 21. Thus, the speed of the driving disc is then substantially multiplied and the driven disc 21 is driven much faster.

Because it is desirable to effectuate changes in the tilt or angularity of the transmission disc in order to vary the speed ratio, I provide a particular mechanism for that purpose.

The transmission disc 31 includes an enlarged hub 51, having a wearresistant insert 52 therein in which the socket 34 is formed. In addition, the insert 52 carries a bore 53 within which a cup 54 is slidable. The cup has a spherical head 56 one end of which seats in a socket 57 properly spaced in a ring 58 surrounding and movable on the drive tube 8. A coil spring 59 interposed between the insert 52 and the cup 54 urges the ball 56 into the socket 57 and simultaneously urges the friction disc 31 into a position with the socket 34 forced against the ball 37.

The ring 58 is conveniently mounted on a carrier 61 urged axially in one direction along the drive tube 8 by a surrounding coil spring 62, one end of which abuts the carrier, preferably in a groove 63 therein, and the other end of which abuts a thrust washer 64 lodged against the hub 12 of the first or drive disc 11. A pair of nuts 66 and 67 threaded upon the drive tube 8 affords a stop for the parts against the urgency of the spring 62 so that the drive disc 11, the transmission disc or discs 31 and the driven disc 21 are always held in precisely the desired interfrictional thrust contact.

Means are provided for moving the carrier 61 axially of the drive tube 8. For that reason, the carrier 61 has a through pin 71 extending diametrically thereof and passing through a pair of elongated slots 72 in the drive tube to be lodged in a central control rod 73 coaxial with the drive tube and extending throughout substantially the entire length thereof. With this connection, movement axially of the control rod moves the pin 71 and correspondingly shifts the carrier 61 and moves the ring and the head 56 to cause a corresponding tilt of the transmission disc 31. The difference in travel of the head 56 in a linear path and the arc of motion of the hub 51 is taken up by reciprocating motion between the insert 52 and the cup 54 under the urgency of the spring 59.

In order to move the control rod and the cross pin 71 in an appropriate fashion, I preferably provide means automatically responsive to speed of the drive tube.

As particularly shown in FIG. 2, the control rod 73 also carries a second through pin 81 extending from the control rod through appropriate slots 82 axially cut in the drive tube and finally seated in the hub 83 of a centrifugal disc 84. There is an anti-friction bushing 86 interposed between the disc 84 and the drive tube, so that the disc 84 is freely slidable in an axial direction thereon. The disc 84 is not entirely planar, but rather has a frustoconical section 87 and a downturned flange 88 adjacent the walls of the housing member 46 but having adequate clearance therefrom. In a similar fashion the drive disc 11 is not planar, but rather has a facing conical surface 89 of substantially the same degree of slope and disposed substantially opposite the surface 87.

The two members 87 and 89 between their facing surfaces define a chamber 91 within which are disposed a number of weight balls 92 subject to centrifugal force and being unrestrained except possibly for relatively minor radial grooves 93 and 94 in the disc 84 and the disc 11 respectively. The grooves are arranged to confine the balls 92 to movement in a radial path.

When the parts are in position for starting; that is, when the drive tube 8 is stationary, the spring 62 has its maximum expansion. Under those conditions the parts are approximately in the position of FIG. 4, with the discs 84 and 11 axially close to each other. When that is true, the control rod is positioned so that the ring 58 has moved into a position so that the transmission discs 31 are tilted with a relatively small radius at the disc 11 and a relatively large radius at the disc 21. As the speed of the drive tube increases, however, the balls 92 tend to move out radially from their near axis position. As they move out, the balls wedge between the surfaces 87 and 89 and force the disc 84 to move axially away from the disc 11. This motion similarly moves the ring 58 to tilt the various transmission discs 31 so that the portion thereof in contact with the driving disc 11 is at a relatively great radius from the axis 7, whereas the portion thereof in contact with the disc 21 is at a relatively small radius with respect to the axis 7. In this way the centrifugal force due to rotation of the balls 92 correspondingly varies the tilt angle of the transmission discs and the ratio of speed transmission between the discs 11 and 21.

Since sometimes the ambient operating conditions for the centrifugal mechanism and for the ratio-changing mechanism are quite different, I prefer to provide around the periphery of the driving disc 11 an O-ring seal 101 in contact with the housing member 46, and similarly provide around the driven disc 21 an O-ring seal 102 in contact with the housing member 47. In this way, various portions of the structure are isolated from each other.

Pursuant to the invention, it is possible to have the benefits of the ratio-changing mechanism but to have the ratio selected manually rather than automatically in response to centrifugal force.

As particularly shown in FIG. 6, the parts generally are as previously described except that the pin 81 of FIG. 2, instead of being carried in the hub 83, rather rests upon a shift collar 106 surrounding the drive tube 8 and having a peripheral groove 107 therein. Entering into the groove are pins 108 on a shifting ring 109 centrally disposed on a lever 111. At one end the lever 111 has a spherical mounting 112 on a pedestal 113, secured to the housing member 46 and thus held stationary. The other end of the lever 111 has a connector 114 joined to a control cable 116 passing through the housing member 46 and having a portion 117 connected to any suitable sort of manual control (not shown). By pulling upon the cable 116, the operator rocks the lever 111 and through the collar shifts the control rod 73, thus moving the control rod axially in a fashion to shift the ring 58 in order to change the tilt of the transmission discs 31. Any suitable ratio can thus be manually selected and maintained.

In both forms of control; that is, both manual and centrifugal, the transmission disc 31 is moved through a wide range of positions, particularly including a position in which the disc 31 is always in contact with the driven disc 21, but can leave contact with the driving disc 11 for the purpose of placing the transmission into a neutral or a no-drive condition. For that reason the disc 11 is somewhat attenuated, and there is provided around the hub 12 but quite freely rotatable with respect thereto, a neutral disc 118 concentric with the axis 7 and having a friction surface 119 in effect continuing the surface 16 but entirely separate and apart therefrom. Thus, when either the manual control 117 or the centrifugal control by the balls 92 is effective to tilt the transmission disc 31 sufficiently, the rim 31 of that disc moving inwardly leaves the driving friction surface 16 and moves on to the surface 119 which has no connection for power rotation. The disc 31 is thus no longer frictionally rotated by power and so can transmit no power to the driven disc. This constitutes a neutral position of the parts.

Although the transmission as so far described has a variable ratio in one direction and also a neutral or no-drive condition, it is sometimes desired to provide in addition a reverse direction of rotation and an additional or substitute neutral condition. Under such circumstances the mechanism is exactly as previously described except that below the housing member 47 and surrounding the drive tube 8 is a reverse housing 121 concentric with the axis 7. In this arrangement, the driven disc 21 is connected by its key 22, not to the sleeve 23, but rather to a sleeve 122 at its lower end carrying a sun gear 123. The sun gear is in mesh with a plurality of planet gears 124, each of which is on a rotational stub shaft 126 mounted in an appropriate hub 127 in a drum 128. A bushing 129 supports the drum 128 on the sleeve 122.

A ring gear 131 meshes with all of the planet gears 124 and has a hub 132 mounted to rotate on the drive tube 8 through a bushing 133. The hub 132 carries a driven sprocket 134 as a replacement for the driven sprocket 26 in the other form of the invention.

The drum 128 has a peripheral friction surface 136 with which a friction band 137 is adapted to cooperate. The band 137 has a pair of end lugs 138 and 139 normally urged apart by a spring 141, but capable of being brought together by operation of a pull cable 142. This extends through a sleeve 143 in the housing 121, and being appropriately manually controlled by any suitable means, not shown. The band 137 when free or released under the urgency of the spring 141 affords no constraint upon the drum 128, but when tightened provides full constraint upon the drum 128 and precludes the rotation of the drum about the axis 7.

When the drum 128 is free to rotate, no power is transmitted from the sleeve 122 to the driven sprocket 134 since the sun gear 123 idly rotates the planet gears around the interior of the ring gear 131, the stub shafts 126 themselves acting as planets. However, when the band 137 is tightened and the hubs 127 are stopped, thus stopping the planetary rotation of the shafts 126, then rotation of the sun gear 123 causes rotation of each of the planet gears 124 about the axis of its shaft 126, and rotates the ring gear 131 so that the sprocket 134 is correspondingly driven. In this fashion, there is provided a disconnection and also a through drive. The direction of rotation of the hub 132 when driven is opposite to the direction of rotation of the sleeve 122, so that in effect there is a reversal of the initial drive direction.

It is usually desired to have a direct drive or a drive in the same direction as the initial drive. For that reason, the drum 128 has an extension provided with a peripheral groove 146 (FIGS. 7, 10 and 11). Designed to ride within the groove 146 is a shoe 147 at the end of a stem 148 on an actuating rod 149 or plunger axially reciprocal within a socket 151 forming part of the housing 121. The plunger 149 is connected for manual operation usually in opposition to the operation of the control cable 116. When the plunger 149 is in its uppermost position the shoe 147 riding in the groove 146 holds the drum 128 in a relatively elevated position. When the plunger 149 is moved to its opposite or lower extreme position the shoe 147 in riding in the groove 146 moves the drum 128 into its opposite lower position or downwardly as seen in FIG. 7. When the drum is lowered it affords an interconnection between depending dog clutch teeth 153 on the drum 128 with opposite upstanding dog clutch teeth 154 on the periphery of the ring gear 131. The drum 128 and the ring gear 131 are thus locked together. When this is true the sun gear 123 cannot rotate the planet gears 124 on their own stub shafts 126 since the ring gear 131 in effect is locked to the hub 127 and all of the planetary mechanism then turns as a unit about the axis 7, the brake band 137 being released so that the drum 128 may revolve bodily. In this fashion there is provided a direct connection so that the sleeve 122 and the driven sprocket 134 both rotate at a one-to-one ratio and in the same direction.

The operator, by selectively actuating the control cable 116 and the plunger 149, can engage and disengage the dog clutch teeth 153 and 154 and apply and release the brake band 137 so that the output from the entire transmission can be either forward or reverse or can be interrupted or neutralized without any power transmission at all. In the latter instance and depending upon the installation, it may be desirable either to retain or to omit the neutral disc 118 from the friction portion of the transmission.

What is claimed is:

1. An automotive transmission comprising a frame, a drive tube, means for mounting said drive tube on said frame for rotation about an axis, a drive disc fixed on said drive tube, means defining on said drive disc a first half-toroidal friction surface concentric with said axis and open in a direction parallel to said axis, a driven tube, means for mounting said driven tube on said frame for rotation about said axis, a driven disc fixed on said driven tube, means defining on said driven disc a second half-toroidal friction surface concentric with said axis and complementary to said first friction surface, a support, means for mounting said support on said frame and in a position axially disposed between said driven disc and said driving disc, a transmission disc positioned to extend between and to contact said friction surfaces, means including a ball and socket connection at the center of said transmission disc for mounting said transmission disc for rotation and tilting about said center relative to said support, a control rod slidably disposed in said drive tube, and means confined to a plane containing said axis and interconnecting said control rod and said transmission disc for translating sliding motion of said control rod in said drive tube into tilting motion of said transmission disc on said support.

2. An automotive transmission as in claim 1 including a first centrifugal cone secured to said drive tube concentric with said axis, a second centrifugal cone secured to said control rod concentric with said axis, means defining conical surfaces on said cones facing each other and spaced farther apart adjacent said axis than at the periphery of said cones, fly balls disposed between said cones in contact with said conical surfaces, and means urging said cones toward each other.

3. An automotive transmission as in claim 2 in which said means defining conical surfaces include radial, matching grooves.

4. An automotive transmission as in claim 1 in which said interconnecting means includes a ring fixed on said control rod, a ball having its center in said ring, a hemispherical socket adapted to receive said ball, and a spring for urging said socket and said ball together.

5. An automotive transmission as in claim 1 in which said means interconnecting said control rod and said transmission disc includes a ring axially movable with said control rod, means defining a socket in said disc disposed with the axis of said socket on the rotational axis of said disc, and a plunger mounted in said socket and engaging said ring.

6. An automotive transmission as in claim 5 including a spring in said socket urging said plunger toward said ring.

7. An automotive transmission as in claim 1 in which a housing encloses said discs and carries said support.

8. An automotive transmission as in claim 1 including means engaging said drive tube for positioning said discs at predetermined axial distances from each other.

9. An automotive transmission as in claim 1 including a plate mounted for free rotation on said drive tube, and means on said plate defining a friction surface continuing said first friction surface on said drive disc.

10. An automotive transmission as in claim 1 in which said power transmitting disc on said drive tube is a gear in a planetary gear train.

11. An automotive transmission including a drive shaft, a drive disc fast on said drive shaft, a driven shaft, a driven disc fast on said driven shaft, a transmission disc, means for mounting said transmission disc for concurrent frictional driving relationship with both said driving disc and said driven disc, a freely rotatable neutral disc, and means for moving said transmission disc out of frictional driving relationship with one of said driving disc and said driven disc and into frictional driving relationship with said neutral disc.

12. An automotive transmission as in claim 11 including means for mounting said neutral disc coaxially with one of said driving disc and said driven disc.

13. An automotive transmission as in claim 11 including means for mounting said neutral disc for free rotation on one of said drive shaft and said driven shaft, and means for maintaining said neutral disc in superficial alignment with the adjacent one of said driving disc and said driven disc.

14. An automotive transmission as in claim 11 in which said drive disc has a toroidal surface, said transmission disc has a rim in frictional engagement with said surface, and said neutral disc is concentric with said drive disc and has a toroidal friction surface disposed as a substantial continuation of the radially inner portion of said drive disc toroidal surface.

* * * * *

UNITED STATES PATENT OFFICE
CERTIFICATE OF CORRECTION

Patent No. 3,727,474      Dated April 17, 1973

Inventor(s) ROBERT L. FULLERTON

It is certified that error appears in the above-identified patent and that said Letters Patent are hereby corrected as shown below:

On the cover sheet [73], "Fullerton Transiission Company" should read -- Fullerton Transmission Company -- .

Signed and sealed this 18th day of December 1973.

(SEAL)
Attest:

EDWARD M. FLETCHER, JR.
Attesting Officer

RENE D. TEGTMEYER
Acting Commissioner of Patents